US007978771B2

(12) United States Patent
Sato et al.

(10) Patent No.: US 7,978,771 B2
(45) Date of Patent: Jul. 12, 2011

(54) ENCODER, DECODER, AND THEIR METHODS

(75) Inventors: Kaoru Sato, Kanagawa (JP); Toshiyuki Morii, Kanagawa (JP); Tomofumi Yamanashi, Kanagawa (JP)

(73) Assignee: Panasonic Corporation, Osaka (JP)

( * ) Notice: Subject to any disclaimer, the term of this patent is extended or adjusted under 35 U.S.C. 154(b) by 685 days.

(21) Appl. No.: 11/913,966

(22) PCT Filed: Apr. 28, 2006

(86) PCT No.: PCT/JP2006/308940
§ 371 (c)(1),
(2), (4) Date: Feb. 26, 2008

(87) PCT Pub. No.: WO2006/120931
PCT Pub. Date: Nov. 16, 2006

(65) Prior Publication Data

US 2009/0016426 A1 Jan. 15, 2009

(30) Foreign Application Priority Data

May 11, 2005 (JP) ................................ 2005-138151

(51) Int. Cl.
*H04L 27/00* (2006.01)

(52) U.S. Cl. ........ 375/259; 375/340; 704/200; 704/203; 704/230

(58) Field of Classification Search .................. 704/200, 704/203, 230; 375/259, 340
See application file for complete search history.

(56) References Cited

U.S. PATENT DOCUMENTS

| | | | | |
|---|---|---|---|---|
| 7,299,174 B2 | 11/2007 | Sato et al. | | |
| 2003/0172097 A1* | 9/2003 | McGrath | ........................ | 708/300 |
| 2005/0163323 A1 | 7/2005 | Oshikiri | | |
| 2006/0080091 A1 | 4/2006 | Yasunaga et al. | | |
| 2006/0173677 A1 | 8/2006 | Sato et al. | | |
| 2006/0206317 A1 | 9/2006 | Morii et al. | | |

(Continued)

FOREIGN PATENT DOCUMENTS

EP 1047045 2/2001

(Continued)

OTHER PUBLICATIONS

Oshikiri et al., "A Scalable coder designed for 10-KHZ bandwidth speech", Speech Coding, 2002, IEEE Workshop Proceedings, Oct. 6-9, 2002, Piscataway, NJ, USA, IEEE, Oct. 6, 2002, pp. 111-113, XP010647230.*

(Continued)

*Primary Examiner* — Curtis B Odom
(74) *Attorney, Agent, or Firm* — Greenblum & Bernstein, P.L.C.

(57) ABSTRACT

An encoder generating a decoded signal with an improved quality by scalable encoding by canceling the characteristic inherent to the encoder and causing degradation of quality of the decoded signal. In the encoder, a first encoding section (102) encodes the input signal after down sampling, a first decoding section (103) decodes first encoded information outputted from the first encoding section (102), an adjusting section (105) adjusts the first decoded signal after up sampling by convoluting the first decoded signal after up sampling and an impulse response for adjustment, an adder (107) inverses the polarity of adjusted first decoded signal and adds the first decoded signal having the inverted polarity to the input signal, a second encoding section (108) encodes the residual signal outputted from the adder (107), and a multiplexing section (109) multiplexes the first encoded information outputted from the first encoding section (102) and the second encoded information outputted from the second encoding section (108).

11 Claims, 8 Drawing Sheets

U.S. PATENT DOCUMENTS

| | | | |
|---|---|---|---|
| 2007/0033019 | A1 | 2/2007 | Yasunaga et al. |
| 2007/0179780 | A1 | 8/2007 | Yamanashi et al. |
| 2007/0255558 | A1 | 11/2007 | Yasunaga et al. |
| 2007/0271101 | A1 | 11/2007 | Sato et al. |

FOREIGN PATENT DOCUMENTS

| | | |
|---|---|---|
| EP | 1484841 | 12/2004 |
| EP | 1489599 | 12/2004 |
| JP | 10-097295 | 4/1998 |
| JP | 2000-305599 | 11/2000 |
| JP | 2004-252477 | 9/2004 |

OTHER PUBLICATIONS

Yoshida et al., "Code book mapping ni yoru Kyotaiiki Onsei kara Kotaiiki Onsei no Fukugenho," IEICE Technical Report [Onsei], SP93-61, vol. 93, No. 184, pp. 31-38, 1993 Nen.

English language Abstract of JP10-097295.

Schroeder et al., "Code-excited linear prediction (CELP): High-quality speech at very low bit rates," IEEE Proceedings, ICASSP'85, pp. 937-940.

Oshikiri et al., "A Scalable coder designed for 10-KHZ bandwidth speech", Speech Coding, 2002, IEEE Workshop Proceedings, Oct. 6-9, 2002, Piscataway, NJ, USA, IEEE, Oct. 6, 2002, pp. 111-113, XP010647230.

MPEG Digital Video-Coding Standards-Delivering Picture-Perfect Compression for Storage, Transmission, and Multimedia for Storage, Transmission, and Multimedia Applications, IEEE Signal Processing Magazine, IEEE Service Center, Piscataway, NJ, US, vol. 14, No. 5, Sep. 1, 1997, pp. 82-100, XP011089789.

* cited by examiner

ENCODER, DECODER, AND THEIR METHODS

TECHNICAL FIELD

The present invention relates to an encoding apparatus, decoding apparatus, encoding method and decoding method used in a communication system where input signals are subjected to scalable coding and transmitted.

BACKGROUND ART

In the field of digital wireless communication, packet communication typified by Internet communication, and speech storage, the technique for encoding and decoding speech signals is essential for effectively utilizing transmission capacity of radio waves and storage media, and a large number of speech encoding and decoding schemes have been developed.

At present, a speech encoding and decoding scheme adopting a CELP scheme is put into practical use as a major stream (for example, Non-Patent Document 1). The speech coding scheme adopting the CELP scheme mainly stores models of vocalized sound and encodes input speech based on speech models stored in advance.

In recent years, in coding of speech signals and tone signals, a scalable coding technique is developed that applies the CELP scheme and makes it possible to decode speech and tone signals even from part of encoded information and suppress speech quality deterioration even when a packet loss occurs (for example, Patent Document 1).

A scalable coding scheme is generally formed with a base layer and a plurality of enhancement layers, and the layers form a layered structure with the base layer being the lowest layer. In each layer, a residual signal which is a difference between the input signal and output signal of a lower layer is encoded. According to this configuration, it is possible to decode speech and tone using encoded information of all layers or encoded information of a part of layers.

Further, in scalable coding, generally, the sampling frequency of the input signal is transformed, and the down-sampled input signal is encoded. In this case, the residual signal encoded by the higher layer is generated by up-sampling the decoded signal of the lower layer and calculating the difference between the input signal and the up-sampled decoded signal.

Patent Document 1: Japanese Patent Application Laid-Open No. HEI10-97295

Non-Patent Document 1: M. R. Schroeder, B. S. Atal, "Code Excited Linear Prediction: High Quality Speech at Very Low Bit Rate", IEEE proc., ICASSP'85 pp.937-940

DISCLOSURE OF INVENTION

Problems to be Solved by the Invention

Here, generally, the encoding apparatus has unique characteristics which cause quality deterioration of a decoded signal. For example, when the down-sampled input signal is encoded in the base layer, the phase of the decoded signal shifts by sampling frequency transform, and the quality of the decoded signal deteriorates.

However, the conventional scalable coding scheme performs coding without taking into consideration characteristics unique to the encoding apparatus, thereby deteriorating quality of the decoded signal in the lower layer due to the characteristics unique to this encoding apparatus, making the error between the decoded signal and the input signal larger and causing deterioration in coding efficiency of the higher layer.

It is therefore an object of the present invention to provide an encoding apparatus, decoding apparatus, encoding method and decoding method that, even when the encoding apparatus has unique characteristics, make it possible to cancel the characteristics which affect a decoded signal in a scalable coding scheme.

MEANS FOR SOLVING THE PROBLEM

The encoding apparatus of the present invention performs scalable coding on an input signal and adopts a configuration including: a first encoding section that encodes the input signal and generates first encoded information; a first decoding section that decodes the first encoded information and generates a first decoded signal; an adjusting section that adjust the first decoded signal by convolving the first decoded signal and an impulse response for adjustment use; a delaying section that delays the input signal in synchronization with the adjusted first decoded signal; an adding section that calculates a residual signal which is a difference between the delayed input signal and the adjusted first decoded signal; and a second encoding section that encodes the residual signal and generates second encoded information.

The encoding apparatus of the present invention performs scalable coding on an input signal and adopts a configuration including: a frequency transforming section that down-samples the input signal; a first encoding section that encodes the down-sampled input signal and generates first encoded information; a first decoding section that decodes the first encoded information and generates a first decoded signal; a frequency transforming section that up-samples the first decoded signal; an adjusting section that adjusts the up-sampled first decoded signal by convolving the up-sampled first decoded signal and an impulse response for adjustment use; a delaying section that delays the input signal be in synchronization with the adjusted first decoded signal; and an adding section that calculates a residual signal which is a difference between the delayed input signal and the adjusted first decoded signal; and a second encoding section that encodes the residual signal and generates second encoded information.

The decoding apparatus of the present invention decodes the encoded information outputted from the above-described encoding apparatus and adopts a configuration including: a first decoding section that decodes the first encoded information and generates a first decoded signal; a second decoding section that decodes the second encoded information and generates a second decoded signal; an adjusting section that adjust the first decoded signal by convolving the first decoded signal and an impulse response for adjustment use; an adding section that adds up the adjusted first decoded signal and the second decoded signal; and a signal selecting section that selects and outputs one of the first decoded signal generated by the first decoding section and the addition result of the adding section.

The decoding apparatus of the present invention decodes the encoded information outputted from the above-described encoding apparatus and adopts a configuration including: a first decoding section that decodes the first encoded information and generates a first decoded signal; a second decoding section that decodes the second encoded information and generates a second decoded signal; a frequency transforming section that up-samples the first decoded signal; an adjusting section that adjusts the up-sampled first decoded signal by convolving the up-sampled first decoded signal and an impulse response for adjustment use; an adding section that adds up the adjusted first decoded signal and the second decoded signal; and a signal selecting section that selects and outputs one of the first decoded signal generated by the first decoding section and the addition result of the adding section.

The encoding method of the present invention performs scalable coding on an input signal and includes: a first encoding step of encoding the input signal and generating first encoded information; a first decoding step of decoding the first encoded information and generating a first decoded signal; an adjusting step of adjusting the first decoded signal by convolving the first decoded signal and an impulse response for adjustment use; a delaying step of delaying the input signal in synchronization with the adjusted first decoded signal; an adding step of calculating a residual signal which is a difference between the delayed input signal and the adjusted first decoded signal; and a second encoding step of encoding the residual signal and generating second encoded information.

The decoding method decodes the encoded information encoded by the above-described encoding method and includes: a first decoding step of decoding the first encoded information and generating a first decoded signal; a second decoding step of decoding the second encoded information and generating a second decoded signal; an adjusting step of adjusting the first decoded signal by convolving the first decoded signal and an impulse response for adjustment use; an adding step of adding up the adjusted first decoded signal and the second decoded signal; and a signal selecting step of selecting and outputting one of the first decoded signal generated in the first decoding step and the addition result of the adding step.

ADVANTAGEOUS EFFECT OF THE INVENTION

According to the present invention, by adjusting outputted decoded signals, it is possible to cancel characteristics unique to the encoding apparatus and improve the quality of the decoded signal and coding efficiency of higher layers.

BEST MODE FOR CARRYING OUT THE INVENTION

Embodiments of the present invention will be described in detail below with reference to the accompanying drawings. In the following embodiment, a case will be described where CELP type speech encoding and decoding are performed using a signal encoding and decoding method formed with two layers. The layered signal encoding method includes a plurality of signal encoding methods in the higher layer and forms a layered structure, and the plurality of signal encoding methods encode a difference signal between the input signal and the output signal in the lower layer and output encoded information.

Embodiment 1

Figure 1:
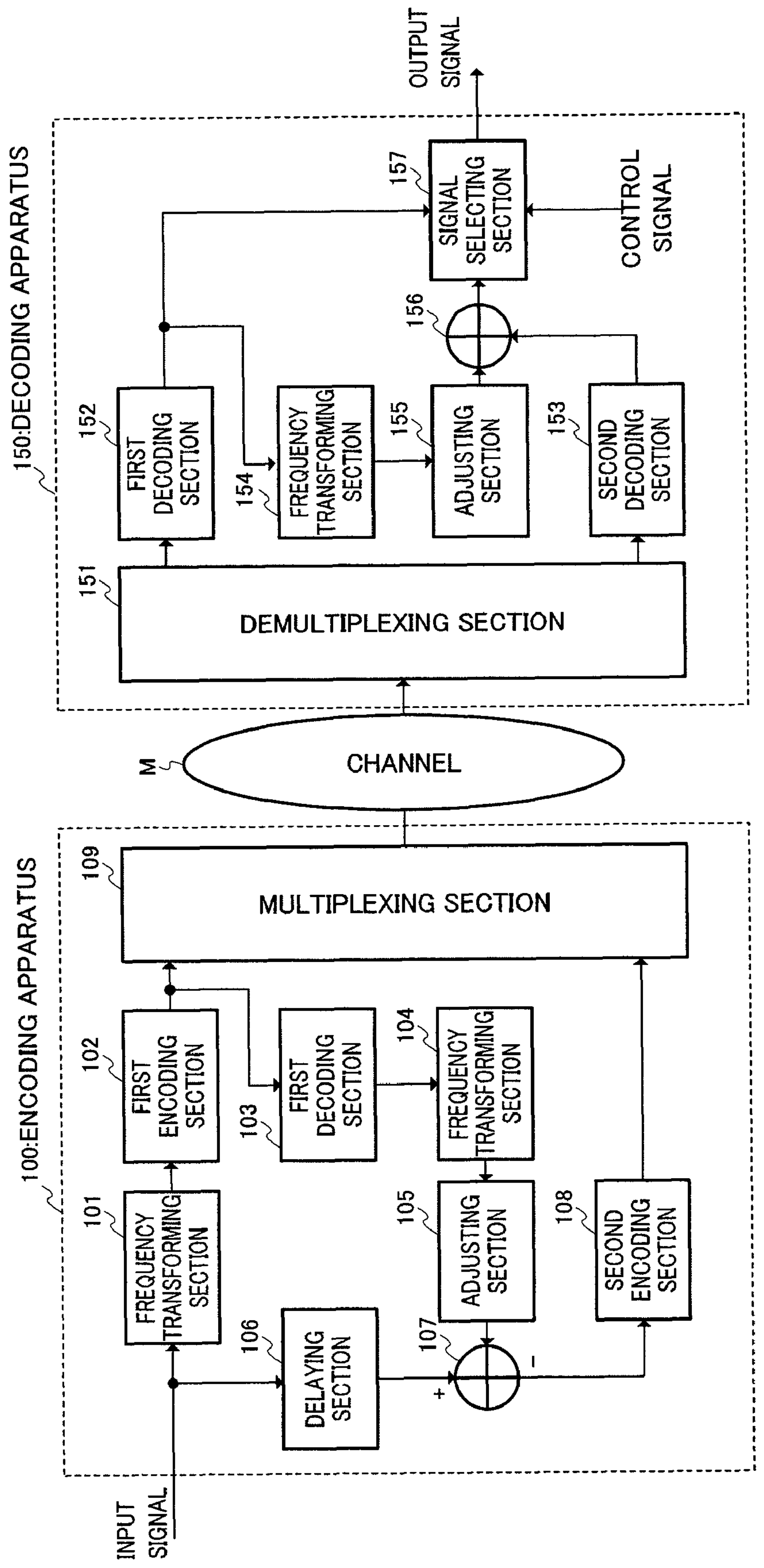
FIG. 1 is a block diagram showing a main configuration of an encoding apparatus and a decoding apparatus according to Embodiment 1 of the present invention.

FIG. 1 is a block diagram showing a main configuration of encoding apparatus 100 and decoding apparatus 150 according to Embodiment 1 of the present invention. Encoding apparatus 100 is mainly configured with frequency transforming sections 101 and 104, first encoding section 102, first decoding section 103, adjusting section 105, delaying section 106, adder 107, second encoding section 108 and multiplexing section 109. Further, decoding apparatus 150 is mainly configured with demultiplexing section 151, first decoding section 152, second decoding section 153, frequency transforming section 154, adjusting section 155, adder 156 and signal selecting section 157. Encoded information outputted from encoding apparatus 100 is transmitted from decoding apparatus 150 via channel M.

Processing of the components of encoding apparatus 100 shown in FIG. 1 will be described below. Signals which are speech and tone signals are inputted to frequency transforming section 101 and delaying section 106. Frequency transforming section 101 transforms the sampling frequency of the input signal and outputs the down-sampled input signal to first encoding section 102.

First encoding section 102 encodes the down-sampled input signal using a CELP scheme speech and tone signal encoding method and outputs first encoded information generated by the encoding, to first decoding section 103 and multiplexing section 109.

First decoding section 103 decodes the first encoded information outputted from first encoding section 102 using a CELP scheme speech and tone signal decoding method and outputs a first decoded signal generated by the decoding, to frequency transforming section 104. Frequency transforming section 104 transforms the sampling frequency of the first decoded signal outputted from first decoding section 103 and outputs the up-sampled first decoded signal to adjusting section 105.

Adjusting section 105 adjusts the up-sampled first decoded signal by convolving the up-sampled first decoded signal and an impulse response for adjustment use, and outputs the adjusted first decoded signal to adder 107. In this way, by adjusting the up-sampled first decoded signal at adjusting section 105, it is possible to cancel characteristics unique to the encoding apparatus. The internal configuration and convolution processing of adjusting section 105 will be described in detail later.

Delaying section 106 temporarily stores the inputted speech and tone signal to a buffer, extracts the speech and tone signal from the buffer in temporal synchronization with the first decoded signal outputted from adjusting section 105 and outputs the signal to adder 107. Adder 107 reverses the polarity of the first decoded signal outputted from adjusting section

105, adds the polarity-reversed first decoded signal to the input signal outputted from delaying section 106 and outputs a residual signal, which is the addition result, to second encoding section 108.

Second encoding section 108 encodes the residual signal outputted from adder 107 using the CELP scheme speech and tone signal encoding method and outputs second encoded information generated by the encoding, to multiplexing section 109.

Multiplexing section 109 multiplexes the first encoded information outputted from first encoding section 102 and the second encoded information outputted from second encoding section 108, and outputs the result to channel M as multiplex information.

Next, processing of the components of decoding apparatus 150 shown in FIG. 1 will be described. Demultiplexing section 151 demultiplexes the multiplex information transmitted from encoding apparatus 100 into the first encoded information and the second encoded information, and outputs the first encoded information to first decoding section 152 and the second encoded information to second decoding section 153.

First decoding section 152 receives the first encoded information from demultiplexing section 151, decodes the first encoded information using the CELP scheme speech and tone signal decoding method and outputs a first decoded signal obtained by the decoding, to frequency transforming section 154 and signal selecting section 157.

Second decoding section 153 receives the second encoded information from demultiplexing section 151, decodes the second encoded information using the CELP scheme speech and tone signal decoding method and outputs a second decoded signal obtained by the decoding, to adder 156.

Frequency transforming section 154 transforms the sampling frequency of the first decoded signal outputted from first decoding section 152 and outputs the up-sampled first decoded signal to adjusting section 155.

Adjusting section 155 adjusts the first decoded signal outputted from frequency transforming section 154 using the same method as adjusting section 105 and outputs the adjusted first decoded signal to adder 156.

Adder 156 adds the second decoded signal outputted from second decoding section 153 and the first decoded signal outputted from adjusting section 155 and obtains a second decoded signal which is the addition result.

Signal selecting section 157 outputs to the subsequent step one of the first decoded signal outputted from first decoding section 152 and the second decoded signal outputted from adder 156, based on a control signal.

Next, the frequency transform processing in encoding apparatus 100 and decoding apparatus 150 will be described in detail using an example where frequency transforming section 101 down-samples the input signal having a sampling frequency of 16 kHz to a signal having a sampling frequency of 8 kHz.

In this case, first, frequency transforming section 101 inputs the input signal to a low pass filter and cuts high frequency components (4 to 8 kHz) so that the frequency components of the input signal fall within 0 to 4 kHz. Frequency transforming section 101 extracts every other sample of the input signal having passed through the low pass filter, and makes a series of the extracted sample a down-sampled input signal.

Frequency transforming sections 104 and 154 up-sample the first decoded signal having a sampling frequency of 8 kHz to a signal having a sampling frequency of 16 kHz. To be more specific, frequency transforming sections 104 and 154 insert samples having "0" values between the samples of the first decoded signal of 8 kHz and extend the sample sequence of the first decoded signal to a double length. Frequency transforming sections 104 and 154 then input the extended first decoded signal to the low pass filter and cut high frequency components (4 to 8 kHz) so that the frequency components of the first decoded signal fall within 0 to 4 kHz. Frequency transforming sections 104 and 154 then compensate for the power of the first decoded signal having passed through the low pass filter, and make the compensated first decoded signal an up-sampled first decoded signal.

The power compensation is performed according to the following steps. Frequency transforming sections 104 and 154 store coefficient r for power compensation. The initial value for coefficient r is "1". Further, the initial value for coefficient r may be changed so as to be a value suitable for encoding apparatuses. The following processing is performed per frame. First, from the following equation 1, the RMS (Root Mean Square) of the first decoded signal before extending and RMS' of the first decoded signal having passed through the low pass filter, are calculated.

(Equation 1)

$$\mathrm{RMS} = \sqrt{\frac{\sum_{i=0}^{N/2-1} ys(i)^2}{N/2}} \qquad [1]$$

$$\mathrm{RMS}' = \sqrt{\frac{\sum_{i=0}^{N-1} ys'(i)^2}{N}}$$

Here, ys(i) is the first decoded signal before extending, and i takes values between 0 and N/2−1. Further, ys' (i) is the first decoded signal having passed through the low pass filter, and i takes values between 0 and N−1. Further, N is a frame length. Next, for each i (0 to N−1), coefficient r is updated, and power of the first decoded signal is compensated by the following equation 2.

(Equation 2)

$$r = r \times 0.99 + (\mathrm{RMS}/\mathrm{RMS}') \times 0.01 \qquad [2]$$

$$ys''(i) = ys'(i) \times r$$

The upper part of equation 2 is an equation for updating coefficient r, and the value of coefficient r is subjected to the processing in the next frame after power compensation is performed at the present frame. The lower part of equation 2 is an equation for performing power compensation using coefficient r. ys"(i) calculated from equation 2 is the first decoded signal after up-sampling. The values of 0.99 and 0.01 in equation 2 may be changed so as to be values suitable for encoding apparatuses. Further, in equation 2, when the value of RMS' is "0", processing is performed so as to calculate the value of (RMS/RMS'). For example, when the value of RMS' is "0", the value of RMS is substituted for RMS' so that the value of (RMS/RMS') becomes "1".

Figure 2:
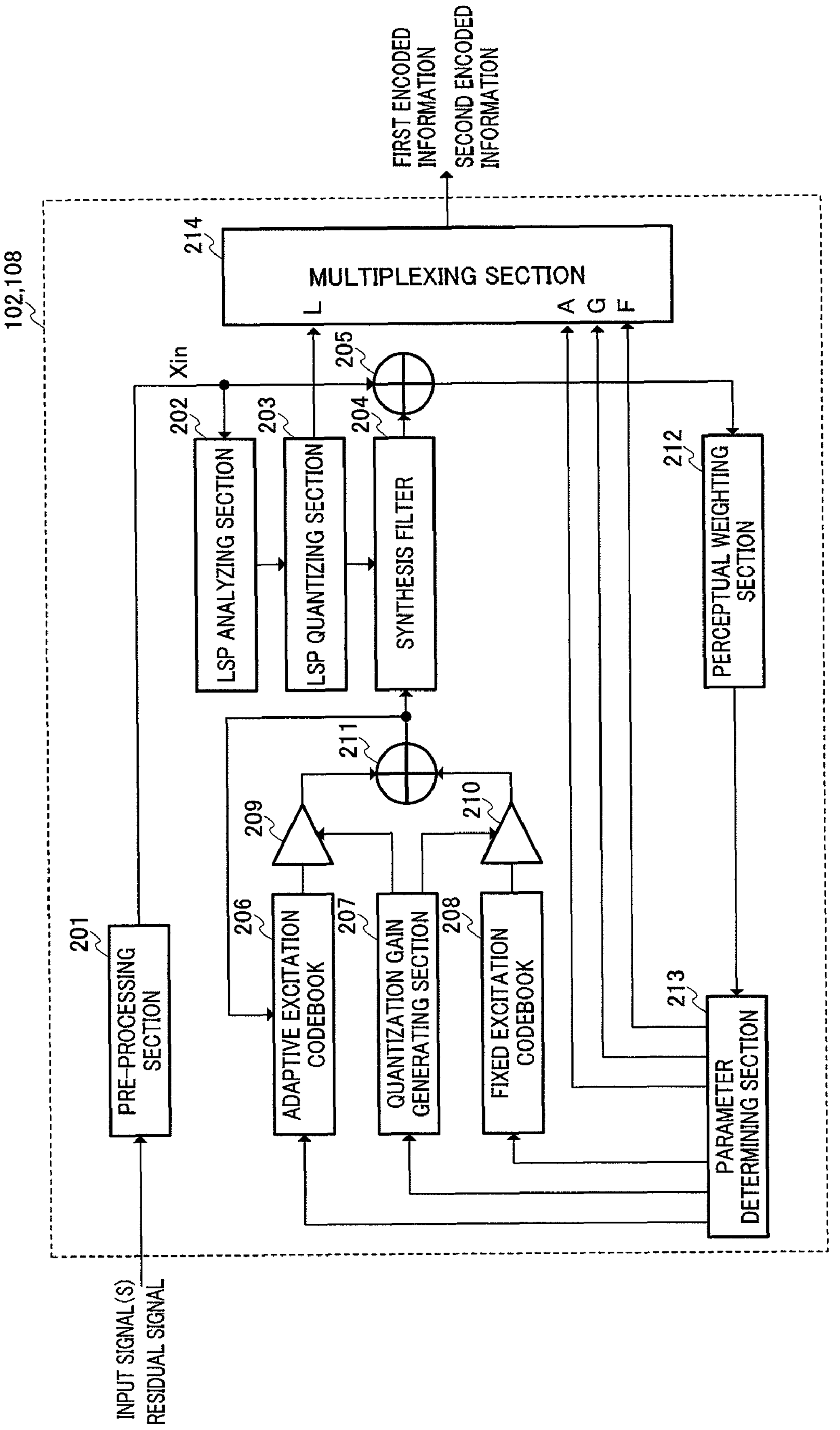
FIG. 2 is a block diagram showing an internal configuration of a first encoding section and second encoding section according to Embodiment 1 of the present invention.

Next, the internal configurations of first encoding section 102 and second encoding section 108 will be described using the block diagram of FIG. 2. In addition, these encoding sections have the same internal configuration but apply different sampling frequencies for a speech and tone signal to be encoded. Further, first encoding section 102 and second encoding section 108 separate the inputted speech and tone signal into N samples each (where N is a natural number) and encode the signal per frame using N samples as one frame. The value of N is often different between first encoding section 102 and second encoding section 108.

One of the input signal and residual signal, which is the speech and tone signal, is inputted to pre-processing section 201. Pre-processing section 201 performs high pass filter processing that removes DC components, wave shaping processing which leads to improvement of performance of subsequent encoding processing and pre-emphasis processing, and outputs the processed signal (Xin) to LSP analyzing section 202 and adder 205.

LSP analyzing section 202 performs linear predictive analysis using Xin, converts an LPC (Linear Predictive Coefficient), which is the analyzing result, to LSP (Line Spectral Pairs) and outputs the results to LSP quantizing section 203.

LSP quantizing section 203 performs quantizing processing on the LSP outputted from LSP analyzing section 202 and outputs the quantized LSP to synthesis filter 204. Further, LSP quantizing section 203 outputs a quantized LSP code (L) representing the quantized LSP, to multiplexing section 214.

Synthesis filter 204 generates a synthesized signal by performing filter synthesis on the excitation outputted from adder 211 (described later) using a filter coefficient based on the quantized LSP and outputs the synthesized signal to adder 205.

Adder 205 calculates an error signal by reversing the polarity of the synthesized signal and adding the polarity-reversed synthesized signal to Xin, and outputs the error signal to perceptual weighting section 212.

Adaptive excitation codebook 206 stores in a buffer the excitation outputted by adder 211 in the past, cuts out samples in one frame from the cut out position specified by the signal outputted from parameter determining section 213 and outputs the samples to multiplier 209 as an adaptive excitation vector. Further, adaptive excitation codebook 206 updates the buffer every time an excitation is inputted from adder 211.

Quantization gain generating section 207 determines a quantization adaptive excitation gain and quantization fixed excitation gain using the signal outputted from parameter determining section 213 and outputs these gains to multiplier 209 and multiplier 210, respectively.

Fixed excitation codebook 208 outputs a vector having the shape specified by the signal outputted from parameter determining section 213 to multiplier 210 as a fixed excitation vector.

Multiplier 209 multiplies the adaptive excitation vector outputted from adaptive excitation codebook 206 by the quantization adaptive excitation gain outputted from quantization gain generating section 207 and outputs the result to adder 211. Multiplier 210 multiplies the fixed excitation vector outputted from fixed excitation codebook 208 by the quantization fixed excitation gain outputted from quantization gain generating section 207 and outputs the result to adder 211.

Adder 211 receives the gain-multiplied adaptive excitation vector and fixed excitation vector from multiplier 209 and multiplier 210, respectively, adds the gain-multiplied adaptive excitation vector and fixed excitation vector and outputs an excitation, which is the addition result, to synthesis filter 204 and adaptive excitation codebook 206. The excitation inputted to adaptive excitation codebook 206 is stored in the buffer.

Perceptual weighting section 212 assigns perceptual weight to the error signal outputted from adder 205 and outputs the result to parameter determining section 213 as coding distortion.

Parameter determining section 213 selects from adaptive excitation codebook 206 an adaptive excitation lag that minimizes the coding distortion outputted from perceptual weighting section 212 and outputs an adaptive excitation lag code (A) indicating the selection result to multiplexing section 214. Here, an “adaptive excitation lag” is the position where the adaptive excitation vector is cut out, and will be described in detail later. Further, parameter determining section 213 selects from fixed excitation codebook 208 a fixed excitation vector that minimizes the coding distortion outputted from perceptual weighting section 212 and outputs a fixed excitation vector code (F) indicating the selection result to multiplexing section 214. Furthermore, parameter determining section 213 selects from quantization gain generating section 207 a quantization adaptive excitation gain and quantization fixed excitation gain that minimize the coding distortion outputted from perceptual weighting section 212 and outputs a quantization excitation gain code (G) indicating the selection results to multiplexing section 214.

Multiplexing section 214 receives the quantized LSP code (L) from LSP quantizing section 203, receives the adaptive excitation lag code (A), fixed excitation vector code (F) and quantization excitation gain code (G) from parameter determining section 213, multiplexes these information and outputs the result as encoded information. Here, the encoded information outputted from first encoding section 102 is used as first encoded information, and the encoded information outputted from second encoding section 108 is used as second encoded information.

Next, processing of determining a quantized LSP at LSP quantizing section 203 will be simply described using an example where eight bits are assigned to the quantized LSP code (L) and an LSP is subjected to vector quantization.

LSP quantizing section 203 is provided with an LSP codebook that stores 256 types of LSP code vectors $lsp^{(l)}(i)$ created in advance. Here, l is an index assigned to the LSP code vectors and takes values between 0 and 255. Further, LSP code vector $lsp^{(l)}(i)$ is an N-dimensional vector, and i takes values between 0 and N−1. LSP quantizing section 203 receives LSPα(i) outputted from LSP analyzing section 202. Here, LSPα(i) is an N-dimensional vector, and i takes values between 0 and N−1.

Next, LSP quantizing section 203 calculates square error er between LSPα(i) and LSP code vectors $lsp^{(l)}(i)$ from equation 3.

(Equation 3)

$$er = \sum_{i=0}^{N-1} (\alpha(i) - lsp^{(l)}(i))^2 \quad [3]$$

Next, LSP quantizing section 203 calculates square errors er for all l's and determines the value of l which minimizes square error er ($l_{min}$). Next, LSP quantizing section 203 outputs $l_{min}$ to multiplexing section 214 as a quantized LSP code (L) and outputs $lsp^{(lmin)}(i)$ to synthesis filter 204 as a quantized LSP.

In this way, $lsp^{(lmin)}(i)$ calculated by LSP quantizing section 203 is a “quantized LSP.”

Next, processing of determining an adaptive excitation lag at parameter determining section 213 will be described using FIG. 3.

Figure 3:
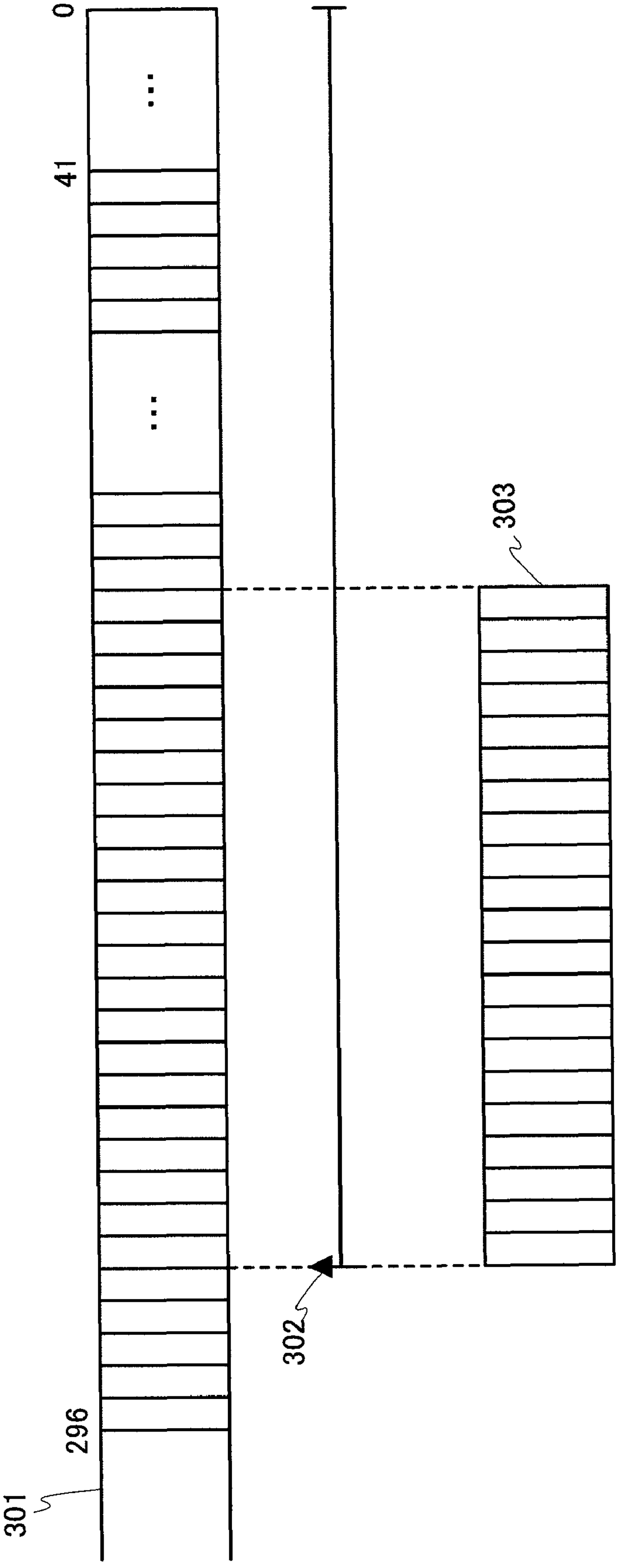
FIG. 3 simply illustrates processing of determining an adaptive excitation lag.

In this FIG. 3, buffer 301 is provided to adaptive excitation codebook 206, position 302 is the position where the adaptive excitation vector is cut out, and vector 303 is the cut out adaptive excitation vector. Further, numerical values "41" and "296" are the upper limit and the lower limit of the moving range of cut out position 302.

When eight bits are assigned to the code (A) representing the adaptive excitation lag, the moving range of cut out position 302 can be set a length of "256" (for example, from 41 to 296). Further, the moving range of cut out position 302 can be set arbitrarily.

Parameter determining section 213 moves cut out position 302 within the set range and sequentially indicates cut out position 302 to adaptive excitation codebook 206. Adaptive excitation codebook 206 cuts out adaptive excitation vector 303 corresponding to a frame length using cut out position 302 indicated by parameter determining section 213 and outputs the cut out adaptive excitation vector to multiplier 209. Parameter determining section 213 calculates the coding distortion outputted from perceptual weighting section 212 for the case where adaptive excitation vector 303 is cut out at all cut out positions 302, and determines cut out position 302 that minimizes the coding distortion.

In this way, cut out position 302 of the buffer calculated by parameter determining section 213 is the "adaptive excitation lag."

Next, processing of determining a fixed excitation vector at parameter determining section 213 will be described using FIG. 4. Here, a case will be described as an example where twelve bits are assigned to a fixed excitation vector code (F).

Figure 4:
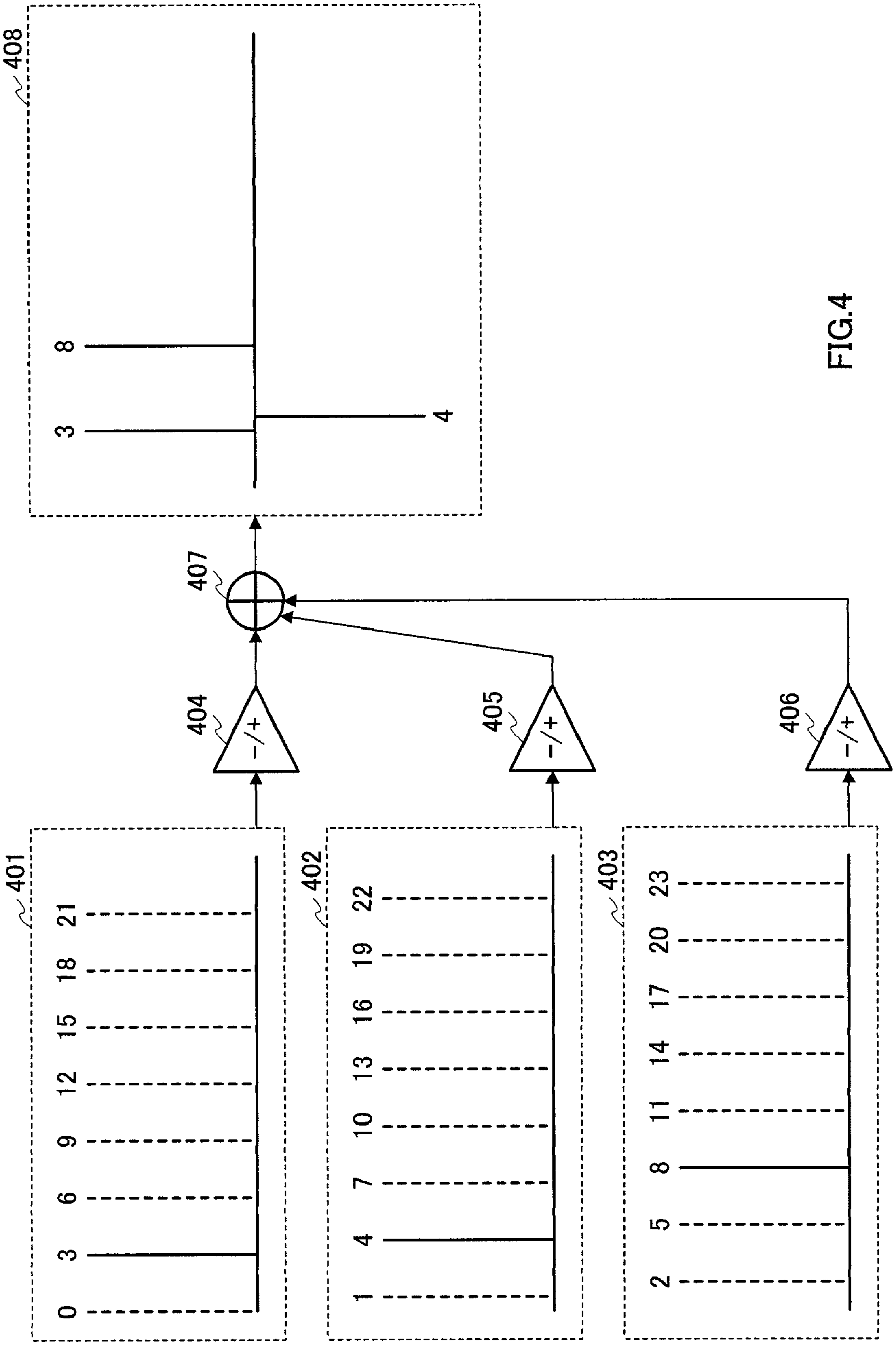
FIG. 4 simply illustrates processing of determining a fixed excitation vector.

In FIG. 4, track 401, track 402 and track 403 each generate one unit pulse (where the amplitude value is 1). Further, multiplier 404, multiplier 405 and multiplier 406 each assign polarity to the unit pulses generated at tracks 401 to 403. Adder 407 adds up the three generated unit pulses, and vector 408 is a "fixed excitation vector" comprised of the three unit pulses.

The position where the unit pulse can be generated varies between the tracks. In FIG. 4, track 401 sets one unit pulse at one of eight positions {0,3,6,9,12,15,18,21}, track 402 sets one unit pulse at one of eight positions {1,4,7,10,13,16,19, 22}, and track 403 sets one unit pulse at one of eight positions {2,5,8,11,14,17,20,23}.

Next, multipliers 404 to 406 assign polarities to the generated unit pulses, and adder 407 adds up the three generated unit pulses, thereby forming fixed excitation vector 408, which is the addition result.

In this example, there are eight positions and two polarities of positive and negative for each unit pulse, and position information of three bits and polarity information of one bit are used to represent each unit pulse. Therefore, the fixed excitation codebook includes twelve bits in total. Parameter determining section 213 shifts the generation positions and polarities of the three unit pulses and sequentially indicates the generation positions and polarities to fixed excitation codebook 208. Fixed excitation codebook 208 forms fixed excitation vector 408 using the generation positions and polarities indicated from parameter determining section 213 and outputs formed fixed excitation vector 408 to multiplier 210. Parameter determining section 213 finds the coding distortion outputted from perceptual weighting section 212 for all combinations of generation positions and polarities, and determines a combination of a generation position and polarity that minimizes the coding distortion. Parameter determining section 213 outputs a fixed excitation vector code (F) representing the combination of the generation position and polarity that minimizes the coding distortion to multiplexing section 214.

Next, processing of determining at parameter determining section 213 the quantization adaptive excitation gain and quantization fixed excitation gain generated by quantization gain generating section 207 will be simply described using an example where eight bits are assigned to the quantization excitation gain code (G). Quantization gain generating section 207 is provided with an excitation gain codebook that stores 256 types of excitation gain code vectors $gain^{(k)}(i)$ created in advance. Here, k is an index assigned to the excitation gain code vectors and takes values between 0 and 255. Further, excitation gain code vector $gain^{(k)}(i)$ is a two-dimensional vector, and i takes values between 0 and 1. Parameter determining section 213 sequentially indicates the value of k from 0 to 255 to quantization gain generating section 207. Quantization gain generating section 207 selects excitation gain code vectors $gain^{(k)}(i)$ from the excitation gain codebook using k indicated from parameter determining section 213, outputs $gain^{(k)}(0)$ to multiplier 209 as a quantization adaptive excitation gain, and outputs $gain^{(k)}(1)$ to multiplier 210 as a quantization fixed excitation gain.

In this way, $gain^{(k)}(0)$ calculated by quantization gain generating section 207 is the "quantization adaptive excitation gain," and $gain^{(k)}(1)$ is the "quantization fixed excitation gain."

Parameter determining section 213 calculates the coding distortion outputted from perceptual weighting section 212 for all ks and determines the value of k that minimizes the coding distortion ($k_{min}$). Parameter determining section 213 outputs $k_{min}$ to multiplexing section 214 as the quantization excitation gain code (G)

Figure 5:
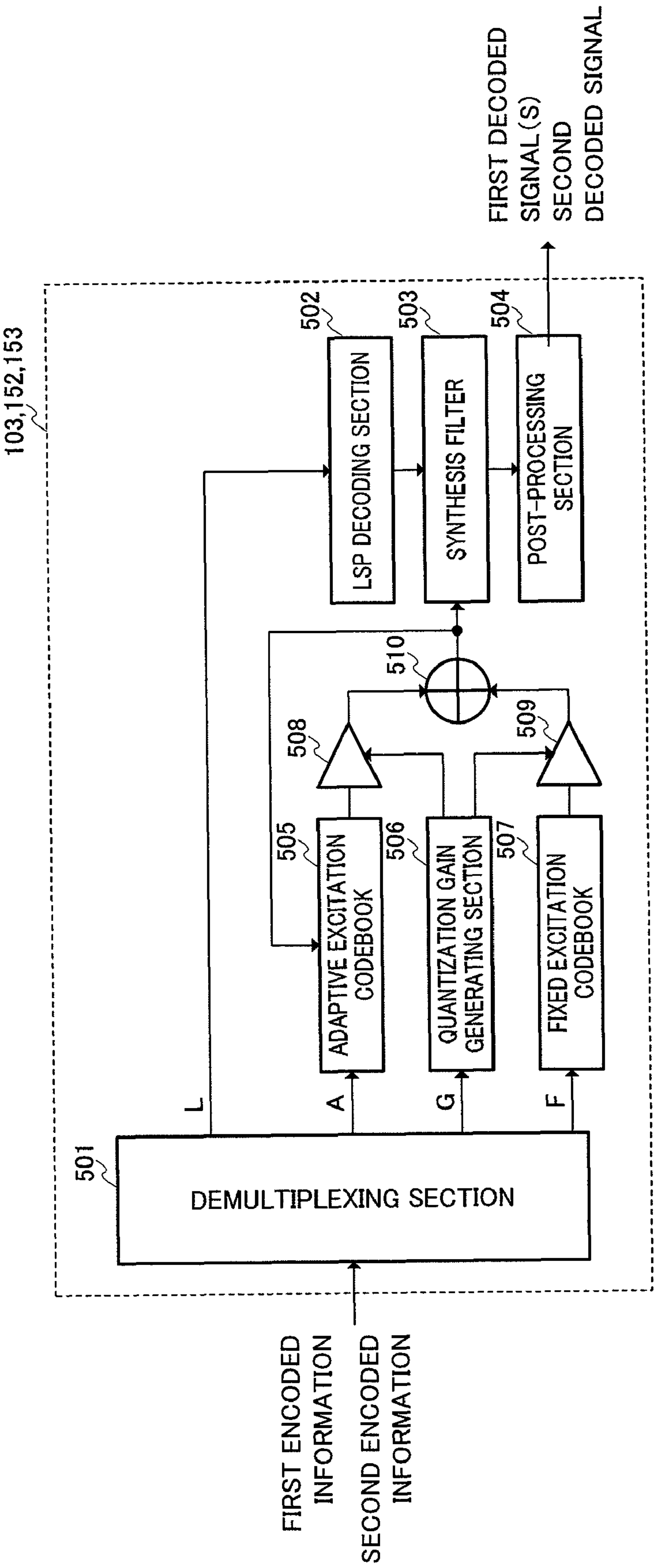
FIG. 5 is a block diagram showing an internal configuration of a first decoding section and second decoding section according to Embodiment 1 of the present invention.

Next, internal configurations of first decoding section 103, first decoding section 152 and second decoding section 153 will be described using the block diagram of FIG. 5. These decoding sections have the same internal configuration.

One of the first encoded information and second encoded information is inputted to demultiplexing section 501 as encoded information. The inputted encoded information is demultiplexed into individual codes (L, A, G and F) by demultiplexing section 501. The demultiplexed quantized LSP code (L), adaptive excitation lag code (A), quantization excitation gain code (G) and fixed excitation vector code (F) are outputted to LSP decoding section 502, adaptive excitation codebook 505, quantization gain generating section 506 and fixed excitation codebook 507, respectively.

LSP decoding section 502 decodes the quantized LSP from the quantized LSP code (L) outputted from demultiplexing section 501 and outputs the decoded quantized LSP to synthesis filter 503.

Adaptive excitation codebook 505 cuts out samples in one frame from the cut out position specified by the adaptive excitation lag code (A) outputted from demultiplexing section 501 and outputs the cut out vector to multiplier 508 as an adaptive excitation vector. Adaptive excitation codebook 505 updates the buffer every time an excitation is inputted from adder 510.

Quantization gain generating section 506 decodes the quantization adaptive excitation gain and quantization fixed excitation gain indicated by the quantization excitation gain code (G) outputted from demultiplexing section 501, outputs the quantization adaptive excitation gain to multiplier 508 and outputs the quantization fixed excitation gain to multiplier 509.

Fixed excitation codebook 507 generates a fixed excitation vector specified by the fixed excitation vector code (F) outputted from demultiplexing section 501 and outputs the fixed excitation vector to multiplier 509.

Multiplier 508 multiplies the adaptive excitation vector by the quantization adaptive excitation gain and outputs the result to adder 510. Multiplier 509 multiplies the fixed excitation vector by the quantization fixed excitation gain and outputs the result to adder 510.

Adder 510 adds the gain-multiplied adaptive excitation vector and fixed excitation vector outputted from multipliers 508 and 509, generates an excitation and outputs the excitation to synthesis filter 503 and adaptive excitation codebook 505. The excitation inputted to adaptive excitation codebook 505 is stored in a buffer.

Synthesis filter 503 performs filter synthesis using the excitation outputted from adder 510 and the filter coefficient decoded by LSP decoding section 502, and outputs the synthesized signal to post-processing section 504.

Post-processing section 504 performs processing for improving subjective speech quality such as formant emphasis and pitch enhancement and processing for improving subjective quality of stationary noise and outputs the result as a decoded signal. Here, the decoded signals outputted from first decoding section 103 and first decoding section 152 are first decoded signals, and the decoded signal outputted from second decoding section 153 is a second decoded signal.

Figure 6:
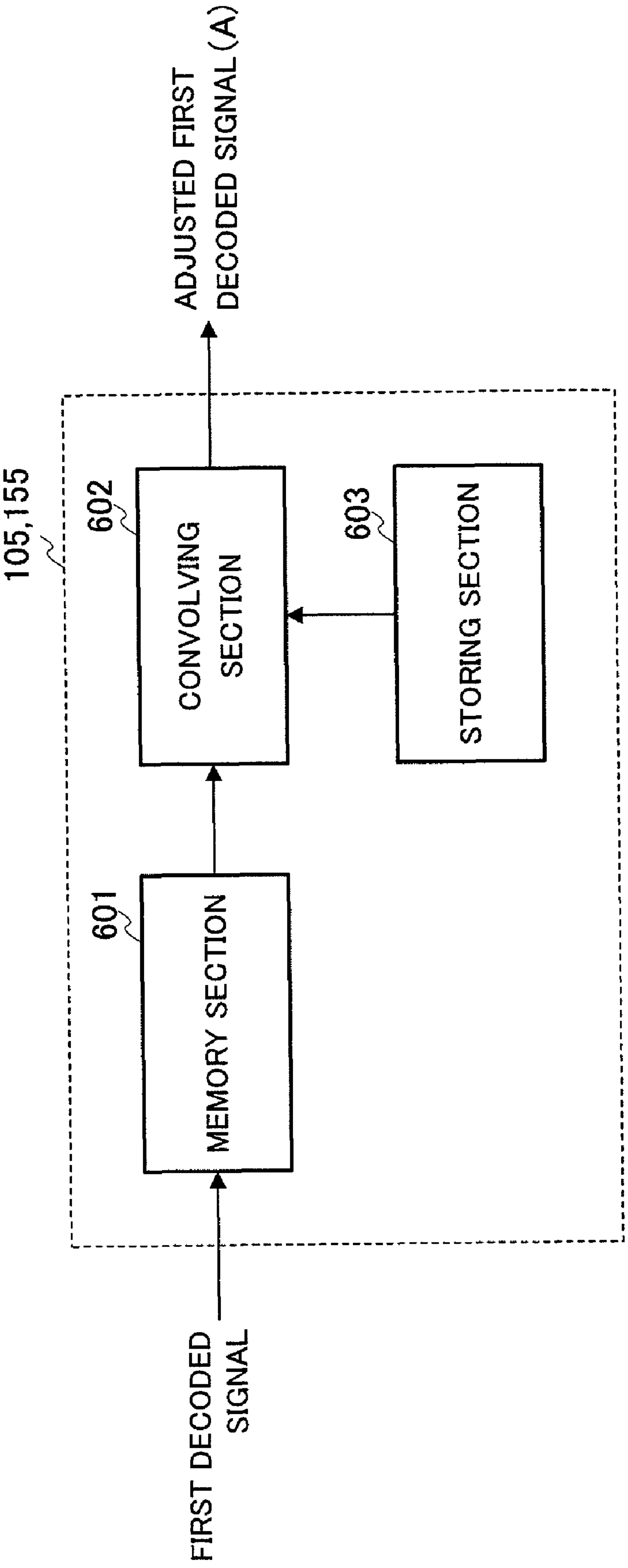
FIG. 6 is a block diagram showing an internal configuration of an adjusting section according to Embodiment 1 of the present invention.

Next, internal configurations of adjusting section 105 and adjusting section 155 will be described using the block diagram of FIG. 6.

Storing section 603 stores impulse response for adjustment use h(i) calculated in advance through a learning method (described later).

The first decoded signal is inputted to memory section 601. The first decoded signal will be expressed as y(i). First decoded signal y(i) is an N-dimensional vector, and i takes values between n and n+N−1. Here, N is a frame length. Further, n is the sample located at the head of each frame, and n is an integral multiple of N.

Memory section 601 is provided with a buffer that stores the first decoded signals outputted earlier from frequency transforming sections 104 and 154. The buffer provided by memory section 601 is expressed as ybuf(i) The length of buffer ybuf(i) is N+W−1, and i takes values between 0 and N+W−2. Here, W is the length of the window when convolving section 602 performs convolution. Memory section 601 updates the buffer using inputted first decoded signal y(i) from equation 4.

$$ybuf(i)=ybuf(i+N)(i=0, \ldots, W-2)$$

$$ybuf(i+W-1)=y(i+n)(i=0, \ldots, N-1) \quad \text{(Equation 4)}$$

By updating equation 4, part of the buffers before updating ybuf(N) to ybuf(N+W−2) is stored in buffers ybuf(0) to ybuf (W−2). Inputted first decoded signals y(n) to y(n+N−1) are stored in buffers ybuf(W−1) to ybuf(N+W−2). Memory section 601 outputs all updated buffers ybuf(i) to convolving section 602.

Convolving section 602 receives buffer ybuf(i) from memory section 601 and receives impulse response for adjustment use h(i) from storing section 603. Impulse response for adjustment use h(i) is a W-dimensional vector, and i takes values between 0 and W−1. Convolving section 602 adjusts the first decoded signal from the convolution of equation 5 and calculates the adjusted first decoded signal.

(Equation 5)

$$ya(n-D+i)=\sum_{j=0}^{W-1} h(j)\times ybuf(W+i-j-1) \quad (i=0, \ldots, N-1) \qquad [5]$$

In this way, adjusted first decoded signal ya(n−D+i) can be calculated by convolving buffer ybuf(i) to ybuf(i+W−1) and impulse response for adjustment use h(0) to h(W−1). Impulse response for adjustment use h(i) is learned so as to make an error between the adjusted first decoded signal and input signal smaller by performing adjustment. Here, the calculated adjusted first decoded signals are ya(n−D) to ya(n−D+N−1), and, compared to first decoded signals y(n) to y(n+N−1) inputted to memory section 601, have a delay of D in time (the number of samples) occurs. Convolving section 602 outputs the calculated first decoded signal.

Next, a method of calculating impulse response for adjustment use h(i) in advance through learning will be described. First, a speech and tone signal for learning use is prepared and inputted to encoding apparatus 100. Here, the speech and tone signal for learning use is expressed as x(i). The speech and tone signal for learning use is encoded and decoded. First decoded signal y(i) outputted from frequency transforming section 104 is inputted to adjusting section 105 per frame. Memory section 601 updates the buffer per frame using equation 4. Square error E(n) per frame unit between speech and tone signal for learning use x(i) and the signal calculated by convolving the first decoded signal stored in the buffer and unknown impulse response for adjustment use h(i), is expressed by equation 6.

(Equation 6)

$$E(n)=\sum_{i=0}^{N-1}\left(x(n-D+i)-\sum_{j=0}^{W-1} h(j)\times ybuf(W+i-j-1)\right)^2 \qquad [6]$$

Here, N is the frame length. Further, n is the sample located at the head of each frame, and n is an integral multiple of N. Furthermore, W is the length of the window upon convolution.

When the total number of frames is R, total sum Ea of square errors E(n) per frame is expressed by equation 7.

(Equation 7)

$$Ea=\sum_{k=0}^{R-1} E(k\times N)=\sum_{k=0}^{R-1}\sum_{i=0}^{N-1}\left(x(k\times N-D+i)-\sum_{j=0}^{W-1} h(j)\times ybuf_k(W+i-j-1)\right)^2 \qquad [7]$$

Here, buffer $ybuf_k(i)$ is buffer ybuf(i) of frame k. Buffer ybuf(i) is updated per frame, and therefore the content of the buffer is different per frame. Further, the values of x(−D) to x(−1) are all set "0". Furthermore, the initial values of buffer ybuf(0) to ybuf(n+W−2) are all set "0".

In order to calculate impulse response for adjustment use h(i), h(i) that minimizes total Ea of square errors of equation 7 is calculated. That is, for all h(J) of equation 7, h(j) that satisfies σEa/σh(j) is calculated. Equation 8 is a simultaneous equation derived from σEa/σh(j)=0. By calculating h(j) that satisfies the simultaneous equation of equation 8, learned impulse response for adjustment use h(i) can be calculated.

(Equation 8)

$$\sum_{k=0}^{R-1}\sum_{i=0}^{N-1} x(k\times N-D+i)\times ybuf_k(W+i-J-1) = \left(\sum_{j=0}^{W-1} h(j)\times\left(\sum_{k=0}^{R-1}\sum_{i=0}^{N-1} ybuf_k(W+i-j-1)\times ybuf_k(W+i-J-1)\right)\right) \quad (J=0,\ldots,W-1) \qquad [8]$$

Next, W-dimensional vector V and W-dimensional vector H are defined by equation 9.

(Equation 9)

$$V=\begin{bmatrix} \sum_{k=0}^{R-1}\sum_{i=0}^{N-1} x(k\times N-D+i)\times ybuf_k(i+W-1) \\ \sum_{k=0}^{R-1}\sum_{i=0}^{N-1} x(k\times N-D+i)\times ybuf_k(i+W-2) \\ \vdots \\ \sum_{k=0}^{R-1}\sum_{i=0}^{N-1} x(k\times N-D+i)\times ybuf_k(i) \end{bmatrix} \qquad [9]$$

$$H=\begin{bmatrix} h(0) \\ h(1) \\ \vdots \\ h(W-1) \end{bmatrix}$$

Further, when W×W matrix Y is defined by equation 10, equation 8 can be expressed as equation 11.

(Equation 10)

$$Y=\begin{bmatrix} \sum_{k=0}^{R-1}\sum_{i=0}^{N-1} ybuf_k(i+W-1)\times ybuf_k(i+W-1) & \sum_{k=0}^{R-1}\sum_{i=0}^{N-1} ybuf_k(i+W-2)\times ybuf_k(i+W-1) & \cdots & \sum_{k=0}^{R-1}\sum_{i=0}^{N-1} ybuf_k(i)\times ybuf_k(i+W-1) \\ \sum_{k=0}^{R-1}\sum_{i=0}^{N-1} ybuf_k(i+W-1)\times ybuf_k(i+W-2) & \sum_{k=0}^{R-1}\sum_{i=0}^{N-1} ybuf_k(i+W-2)\times ybuf_k(i+W-2) & \cdots & \sum_{k=0}^{R-1}\sum_{i=0}^{N-1} ybuf_k(i)\times ybuf_k(i+W-2) \\ \vdots & \vdots & \ddots & \vdots \\ \sum_{k=0}^{R-1}\sum_{i=0}^{N-1} ybuf_k(i+W-1)\times ybuf_k(i) & \sum_{k=0}^{R-1}\sum_{i=0}^{N-1} ybuf_k(i+W-2)\times ybuf_k(i) & \cdots & \sum_{k=0}^{R-1}\sum_{i=0}^{N-1} ybuf_k(i)\times ybuf_k(i) \end{bmatrix} \qquad [10]$$

$$V=Y\cdot H \qquad \text{(Equation 11)}$$

Accordingly, in order to calculate impulse response for adjustment use h(i), vector H is calculated from equation 12.

$$H=Y^{-1}\cdot V \qquad \text{(Equation 12)}$$

In this way, by performing learning using a speech and tone signal for learning use, impulse response for adjustment use h(i) can be calculated. Impulse response for adjustment use h(i) is learned so as to make a square error between the adjusted first decoded signal and input signal smaller by adjusting the first decoded signal. By convolving impulse response for adjustment use h(i) calculated using the above-described method and the first decoded signal outputted from frequency transforming section 104, it is possible to cancel the characteristics unique to encoding apparatus 100 and make the square error between the first decoded signal and input signal smaller.

Next, processing of delaying and outputting the input signal at delaying section 106 will be described. Delaying section 106 stores the inputted speech and tone signal in a buffer. Delaying section 106 extracts the speech and tone signal from the buffer in temporal synchronization with the first decoded signal outputted from adjusting section 105, and outputs the speech and tone signal to adder 107 as an input signal. To be more specific, when the inputted speech and tone signal is one of x(n) to x(n+N−1), a signal having the delay of D in time (the number of samples) is extracted from the buffer, and extracted signal x(n−D) to x(n−D+N−1) is outputted to adder 107 as an input signal.

In this embodiment, a case has been described as an example where encoding apparatus 100 has two encoding sections, but the number of encoding sections is not limited to this and may be three or more.

Further, in this embodiment, a case has been described as an example where decoding apparatus 150 has two decoding sections, but the number of decoding sections is not limited to this and may be three or more.

Furthermore, in this embodiment, a case has been described where the fixed excitation vector generated by fixed excitation codebook 208 is formed with pulses, but the present invention can be also applied to a case where the fixed excitation vector is formed with spread pulses and can obtain the same operation effect as this embodiment. Here, the spread pulse is not a unit pulse but is a pulse-shaped waveform having a particular shape over several samples.

Further, in this embodiment, a case has been described where the encoding section and decoding section adopt a CELP type speech and tone signal encoding and decoding method, but the present invention can be also applied to a case where the encoding section and decoding section adopt a speech and tone signal encoding and decoding method which is not the CELP type (for example, pulse coding modulation, predictive coding, vector quantization and vocoder), and can obtain the same operation effect as this embodiment. Furthermore, the present invention can be also applied to a case where the speech and tone signal encoding and decoding method is different between the encoding sections and decoding sections, and can obtain the same operation effect as this embodiment.

Embodiment 2

Figure 7:
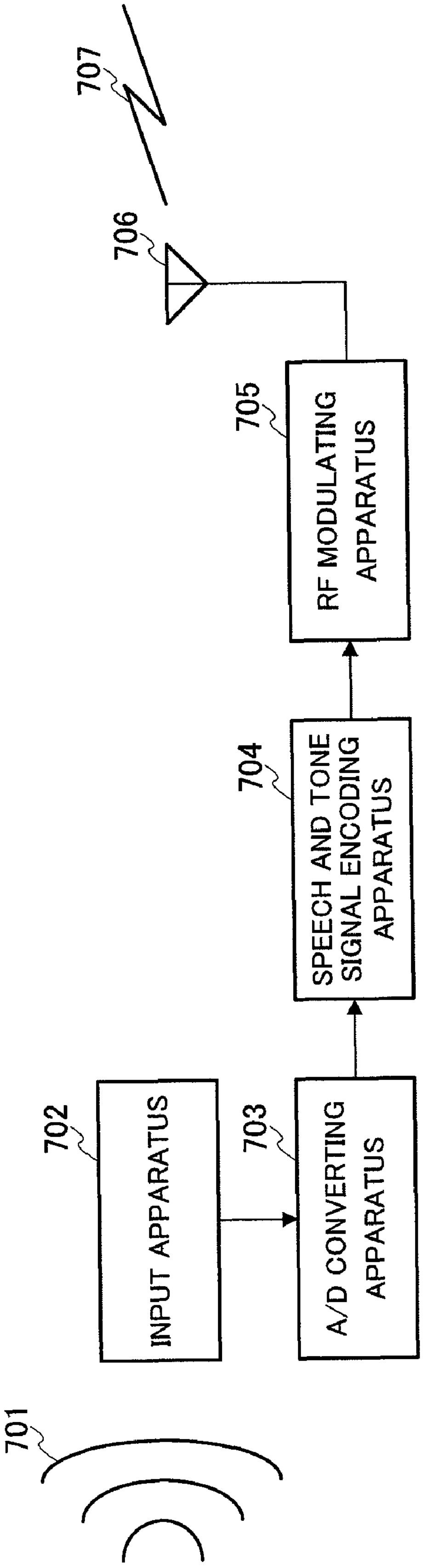
FIG. 7 is a block diagram showing a configuration of a speech and tone signal transmitting apparatus according to Embodiment 2 of the present invention.

FIG. 7 is a block diagram showing a configuration of the speech and tone signal transmitting apparatus according to embodiment 2 of the present invention including the encoding apparatus described in above-described Embodiment 1.

Speech and tone signal 701 is converted to an electrical signal by input apparatus 702 and outputted to A/D converting apparatus 703. A/D converting apparatus 703 converts the (analog) signal outputted from input apparatus 702 to a digital signal and outputs the digital signal to speech and tone signal encoding apparatus 704. Speech and tone signal encoding apparatus 704 has encoding apparatus 100 shown in FIG. 1, encodes the digital speech and tone signal outputted from A/D converting apparatus 703 and outputs encoded information to RF modulating apparatus 705. RF modulating apparatus 705 converts the encoded information outputted from speech and tone signal encoding apparatus 704 to a signal to be transmitted on propagation media such as radio waves and outputs the signal to transmitting antenna 706. Transmitting antenna 706 transmits the output signal outputted from RF modulating apparatus 705 as a radio wave (RF signal). RF signal 707 in FIG. 7 indicates the radio wave (RF signal) transmitted from transmitting antenna 706.

Figure 8:
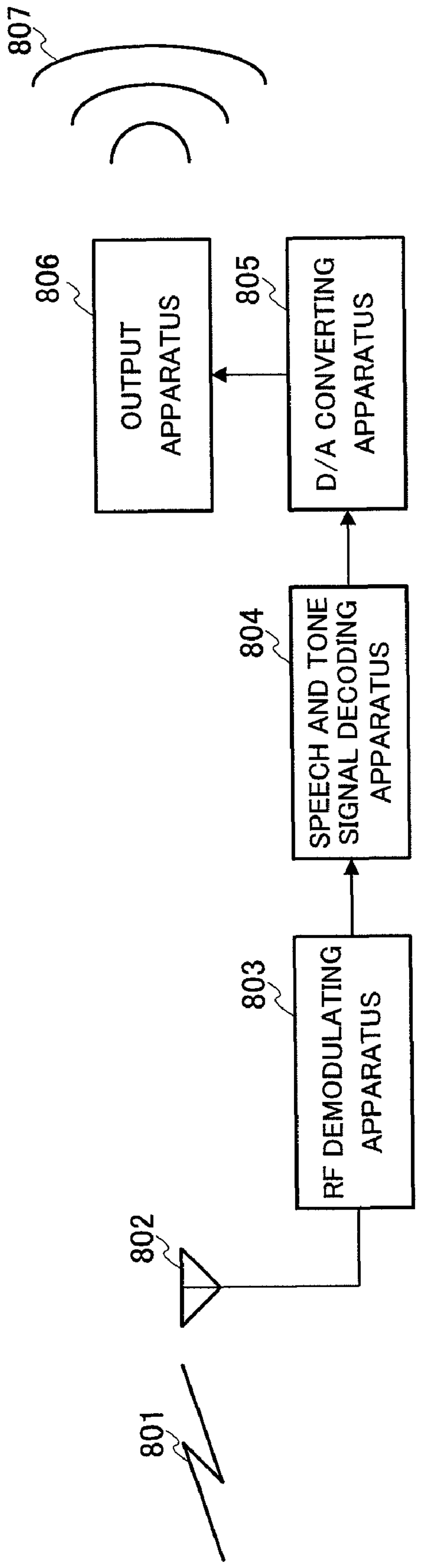
FIG. 8 is a block diagram showing a configuration of a speech and tone signal receiving apparatus according to Embodiment 2 of the present invention.

FIG. 8 is a block diagram showing a configuration of the speech and tone signal receiving apparatus according to Embodiment 2 of the present invention including the decoding apparatus described in above-described Embodiment 1.

RF signal 801 is received by receiving antenna 802 and outputted to RF demodulating apparatus 803. RF signal 801 in FIG. 8 indicates the radio wave received by receiving antenna 802 and is identical to RF signal 707 if the signal is not attenuated or noise is not superimposed on the signal in the channel.

RF demodulating apparatus 803 demodulates encoded information from the RF signal outputted from receiving antenna 802 and outputs the result to speech and tone signal decoding apparatus 804. Speech and tone signal decoding apparatus 804 has decoding apparatus 150 shown in FIG. 1, decodes a speech and tone signal from the encoded information outputted from RF demodulating apparatus 803 and outputs the speech and tone signal to D/A converting apparatus 805. D/A converting apparatus 805 converts the digital speech and tone signal outputted from speech and tone signal decoding apparatus 804 to an analog electrical signal and outputs the signal to output apparatus 806. Output apparatus 806 converts the electrical signal to an air vibration and outputs the air vibration as sound waves so as to be audible by the human ear. In FIG. 8, reference numeral 807 indicates the outputted sound waves.

By providing the above-described speech and tone signal transmitting apparatus and speech and tone signal receiving apparatus to the base station apparatus and communication terminal apparatus in a wireless communication system, it is possible to obtain an output signal with high quality.

In this way, according to this embodiment, the encoding apparatus and decoding apparatus according to the present invention can be provided to a speech and tone signal transmitting apparatus and speech and tone signal receiving apparatus.

The encoding apparatus and decoding apparatus according to the present invention are not limited to above-described Embodiments 1 and 2 and can be implemented by making various modifications.

The encoding apparatus and decoding apparatus according to the present invention can be provided to a mobile terminal apparatus and base station apparatus in a mobile communication system, and it is thereby possible to provide a mobile terminal apparatus and base station apparatus having the same operation effect as described above.

Here, a case has been described as an example where the present invention is implemented with hardware, but the present invention can be implemented with software.

The present application is based on Japanese Patent Application No. 2005-138151, filed on May 11, 2005, the entire content of which is expressly incorporated by reference herein.

INDUSTRIAL APPLICABILITY

The present invention provides an advantage of obtaining a decoded speech signal with high quality even when there are characteristics unique to an encoding apparatus, and is suitable for use as an encoding apparatus and decoding apparatus in a communication system where a speech and tone signal is encoded and transmitted.

The invention claimed is:

1. An encoding apparatus configured to perform scalable coding on an input signal, the encoding apparatus comprising:

a frequency transforming section that down-samples the input signal;

a first encoding section that encodes the down-sampled input signal and generates first encoded information;

a first decoding section that decodes the first encoded information and generates a first decoded signal;

a frequency transforming section that up-samples the first decoded signal;

a storing section that stores an impulse response, the impulse response being configured to adjust the up-sampled first decoded signal such that an error between the input signal and the up-sampled first decoded signal is reduced;

an adjusting section that adjusts the up-sampled first decoded signal by convolving the up-sampled first decoded signal and the impulse response;

a delaying section that delays the input signal in synchronization with the adjusted first decoded signal;

an adding section that calculates a residual signal comprising a difference between the delayed input signal and the adjusted first decoded signal; and a second encoding section that encodes the residual signal and generates second encoded information.

2. The encoding apparatus according to claim 1, wherein the impulse response is calculated by learning.

3. A base station apparatus comprising the encoding apparatus according to claim 1.

4. A communication terminal apparatus comprising the encoding apparatus according to claim 1.

5. A decoding apparatus that decodes encoded information comprising first encoded information and second encoded information, the encoded information being outputted from an encoding apparatus that performs scalable coding on an input signal, wherein the encoding apparatus comprises: a first encoding section that encodes the input signal and generates the first encoded information; a first decoding section that decodes the first encoded information and generates a first decoded signal; an adjusting section that adjusts the first decoded signal by convolving the first decoded signal and a first impulse response for adjustment use; a delaying section that delays the input signal in synchronization with the adjusted first decoded signal; an adding section that calculates a residual signal comprising a difference between the delayed input signal and the adjusted first decoded signal; and a second encoding section that encodes the residual signal and generates the second encoded information, the decoding apparatus comprising:

a first decoding section that decodes the first encoded information and generates a second decoded signal;

a second decoding section that decodes the second encoded information and generates a third decoded signal;

an adjusting section that adjusts the second decoded signal by convolving the second decoded signal and a second impulse response for adjustment use;

an adding section that adds up the adjusted second decoded signal and the third decoded signal; and a signal selecting section that selects and outputs one of the second decoded signal generated by the first decoding section and the addition result of the adding section.

6. The decoding apparatus according to claim 5, wherein the second impulse response for adjustment use is calculated by learning.

7. A base station apparatus comprising the decoding apparatus according to claim 5.

8. A communication terminal apparatus comprising the decoding apparatus according to claim 5.

9. A decoding apparatus that decodes encoded information comprising first encoded information and second encoded information, the encoded information being outputted from an encoding apparatus that performs scalable coding on an input signal, wherein the encoding apparatus comprises: a frequency transforming section that down-samples the input signal; a first encoding section that encodes the down-sampled input signal and generates the first encoded information; a first decoding section that decodes the first encoded information and generates a first decoded signal; a frequency transforming section that up-samples the first decoded signal; an adjusting section that adjusts the up-sampled first decoded signal by convolving the up-sampled first decoded signal and a first impulse response for adjustment use; a delaying section that delays the input signal in synchronization with the adjusted first decoded signal; an adding section that calculates a residual signal comprising a difference between the delayed input signal and the adjusted first decoded signal; and a second encoding section that encodes the residual signal and generates the second encoded information, the decoding apparatus comprising:

a first decoding section that decodes the first encoded information and generates a second decoded signal;

a second decoding section that decodes the second encoded information and generates a third decoded signal;

a frequency transforming section that up-samples the second decoded signal;

an adjusting section that adjusts the up-sampled second decoded signal by convolving the up-sampled second decoded signal and a second impulse response for adjustment use;

an adding section that adds up the adjusted second decoded signal and the third decoded signal; and a signal selecting section that selects and outputs one of the second decoded signal generated by the first decoding section and the addition result of the adding section.

10. A decoding method of decoding encoded information comprising first encoded information and second encoded information, the encoded information being encoded by an encoding method of performing scalable coding on an input signal, wherein the encoding method comprises: encoding the input signal and generating the first encoded information; decoding the first encoded information and generating a first decoded signal; adjusting the first decoded signal by convolving the first decoded signal and a first impulse response for adjustment use; delaying the input signal in synchronization with the adjusted first decoded signal; calculating a residual signal comprising a difference between the delayed input signal and the adjusted first decoded signal; and encoding the residual signal and generating the second encoded information, the decoding method comprising:

decoding the first encoded information and generating a second decoded signal;

decoding the second encoded information and generating a third decoded signal;

adjusting the second decoded signal by convolving the second decoded signal and a second impulse response for adjustment use;

generating an addition result by adding up the adjusted second decoded signal and the third decoded signal; and selecting and outputting one of the second decoded signal and the addition result of adding up the adjusted second decoded signal and the third decoded signal.

11. An encoding method of performing scalable coding on an input signal, the encoding method comprising:

down-sampling the input signal;

encoding the down-sampled input signal to generate first encoded information;

decoding the first encoded information to generate a first decoded signal;

up-sampling the first decoded signal;

storing an impulse response, the impulse response being configured to adjust the up-sampled first decoded signal such that an error between the input signal and the up-sampled first decoded signal is reduced;

adjusting the up-sampled first decoded signal by convolving the up-sampled first decoded signal and the impulse response;

delaying the input signal in synchronization with the adjusted first decoded signal;

calculating a residual signal comprising a difference between the delayed input signal and the adjusted first decoded signal; and encoding the residual signal to generate second encoded information.

* * * * *